United States Patent [19]

Moran

[11] Patent Number: 4,913,547

[45] Date of Patent: Apr. 3, 1990

[54] OPTICALLY PHASED-LOCKED SPECKLE PATTERN INTERFEROMETER

[76] Inventor: Steven E. Moran, 5386 Montego Pl., San Diego, Calif. 92124

[21] Appl. No.: 150,380

[22] Filed: Jan. 29, 1988

[51] Int. Cl.[4] .............................................. G01B 9/02
[52] U.S. Cl. ..................................... 356/349; 356/360; 73/656
[58] Field of Search ................. 356/349, 360; 73/655, 73/656

[56] References Cited

U.S. PATENT DOCUMENTS

| | | | |
|---|---|---|---|
| 3,622,794 | 11/1971 | Pond et al. | 73/656 |
| 3,649,754 | 3/1972 | Macovski | 178/6.8 |
| 3,816,649 | 6/1974 | Butters et al. | 178/6.8 |
| 3,828,126 | 8/1974 | Ramsey | 73/656 |
| 4,018,531 | 4/1977 | Leendertz | 356/349 |
| 4,191,476 | 3/1980 | Pollard | 356/349 |

OTHER PUBLICATIONS

Optically Phase-Locked Electronic Speckle Pattern Interferometer, Steve. E. Moran, Robert L. Law, Peter N. Craig, and Warren M. Goldberg; 02/01/87.

Primary Examiner—Vincent P. McGraw
Assistant Examiner—S. A. Turner
Attorney, Agent, or Firm—Baker, Maxham, Jester & Meador

[57] ABSTRACT

An optically phase-locked electronic speckle pattern interferometer mixes a local oscillator beam with a beam reflected from a target surface to create a speckle pattern at each of two separate image planes. The speckle pattern includes speckles whose intensities vary as a result of time-varying Doppler shifting of the reflected beam by movement or deformation of the target surface. The local oscillator beam is phase-locked to the Doppler signature of a lock-point speckle on one image plane. The phase-locking of the local oscillator beam to Doppler information of interest enables the interferometer to coherently detect speckle in the image plane sharing frequency, amplitude, and phase characteristics with the lock-point speckle, which supports the efficient processing of images obtained from the other image plane. The processing produces a contoured image of the target surface, with demarcation between coherently and non-coherently detected speckle.

27 Claims, 8 Drawing Sheets

OPTICALLY PHASED-LOCKED SPECKLE PATTERN INTERFEROMETER

FIELD OF THE INVENTION

The invention is in the field of optical interferometric inspection, and more particularly concerns an apparatus and a method for phase-locked, optical interferometric inspection of a surface.

BACKGROUND OF THE INVENTION

Speckle pattern inferometry (SPI) is a useful technique for evaluation of a vibrating surface. In this regard, inspection of a vibrating surface signifies a procedure used to analyze structure connected with a surface under actual or simulated conditions of use. For example, normal modes of oscillation of a structure can be determined by observing the vibrating surface of the structure.

The art of electronic speckle pattern interferometry (ESPI) has developed to provide a means and method for translating mechanical vibrations of an oscillating object surface into electronic signals representing an image of the surface. In this procedure, a first beam of light is generated by reflection from the vibrating surface to be analyzed. Because the object surface is irregular, the scale size of the irregularities being on the order of the light wavelength or greater, a random interference pattern known as "speckle" is produced in the image plane by the first beam. Each speckle is generated by light reflected from a localized area of the object surface. The speckles in the interference pattern are not unlike the speckles produced when a visible beam of laser light reflected from an uneven surface is observed by the human eye. This speckle pattern is then mixed with a second beam, the interference pattern created by this mixing being transformed, at an image plane, into an electronic signal representative of the interference image.

The vibrations of the object surface will dynamically deform, or contour, the surface. Consequently, the optical wavefront reflected from the surface will experience a Doppler shift in frequency. When the reflected beam is mixed with the second beam to form an interference pattern, the Doppler shifts in the wavefront of the first beam produce intensity variations in each image plane speckle, the frequency of these variations corresponding to the amount of Doppler shift inflicted on the reflected beam by a localized vibrational deformation on the object surface.

The speckles (variations in intensity, or brightness) in the interference image are converted into an electronic image. Typically, the electronic image has the form of a standard television signal, which includes a succession of video image frames. Each video image frame is a complete "snap shot" representative of the instantaneous deformation of the object surface at the time the image frame was formed. The succession of instantaneous snap shots is presented visually on a TV camera for viewing. In the prior art, the image of the object surface is processed by combination of successive image frames, which may be, for example, added or subtracted to emphasize or enhance certain features of the image.

In the art, Macovski in his U.S. Pat. No. 3,649,754 establishes the basic complement of elements for a speckle pattern interferometer employed to inspect a dynamically altered object surface. The basic holographic technique and apparatus of the Macovski is elaborated in U.S. Pat. No. 3,816,649 of Butters et al., in which a relationship geometry between the first and second beam was established to limit the range of spatial frequencies in the speckle pattern of the interference image. In Leendertz, U.S. Pat. No. 4,018,531, improvements in the optics used to form the second beam are taught, which result in the second beam satisfying the geometrical relationship of the Butters patent. In Pollard's U.S. Pat. No. 4,191,476, the basic Macovski/Butters speckle pattern interferometer is further improved by using a single set of optics to conduct light of two different wavelengths, to form two respective interference images at the same image plane.

Those skilled in the art will understand that the application of speckle pattern interferometry as currently applied in the inspection sciences is normally limited to apparatus which mechanically isolate both the surface being inspected and the electro-optical system from ambient vibrations induced by the local environment. Such isolation is achievable only through the employment of extreme measures, such as optical tables with elaborate suspension systems. Stability of the optical system is paramount, and should be on the order a fraction of an optical wavelength. The inventor has summarized the efforts in the art to stabilized the optical component of a speckle pattern interferometer in the APPLIED OPTICS article entitled "Optically phase-locked electronic speckle pattern interferometer", V. 26, No. 3, 1 Feb. 1987, Moran et al. Other efforts directed to optical stabilization of prior art speckle pattern interferometers either employ techniques which inherently limit improvements in displacement sensitivity, or which require prior knowledge of the vibrational characteristics of the object surface. Consequently, the prior art speckle pattern interferometer generally remains a laboratory instrument, unsuited to in situ inspection.

A principal objective of the inventor has been to define the basic array of elements necessary to provide an optical speckle pattern interferometer shorn of sensitivity to the environment in which it operates.

Another object of the subject invention is to provide an optical speckle pattern interferometer with features which optically lock the instrument's operation to the dynamic characteristics of a surface being inspected, without prior knowledge of those characteristics, thereby permitting the instrument to distinguish those characteristics from other dynamic environomental characteristics of no interest to the inspection.

A principal advantage of the optical speckle pattern interferometer of the invention is its inherent portability, in contrast to the non-portability of the "optical table" configurations of the prior art speckle pattern interferometers.

SUMMARY OF THE INVENTION

The achievement of these and other objects and advantages by the optically phase-locked speckle pattern interferometer of the invention is based upon the inventor's critical observation that the optical mixing of a first and second beam to produce an interference pattern can be extended, through the use of heterodyning and beam splitting techniques, to create a second speckle pattern at a second image plane, which provides information related to the modulation of the first beam by the object surface. Modulation information represents precisely the dynamic characteristics of interest, and the inventor employs this feature in an electro-optical feedback loop which locks the operation of the speckle pattern interferometer just to the intensity variation in the interference pattern caused by dynamic alterations of the object surface. Such locking essentially "blinds" the inteferometer's operation to other dynamic activity in the application environment which otherwise would be mistaken by the interferometer as originating at the object surface.

The locking of the speckle pattern interferometer's operation to the dynamic activity of the object surface of interest enables the instrument of the invention to be removed from the optical table of the laboratory environment to the location of the object surface. Specifically, this means that a portable instrument package incorporating the optically, phase-locked speckle pattern interferometer of the invention can be conveniently carried to, and reliably operated at, a test location, without regard to background dynamic activity at the test location. For example, such a portable instrument package could be employed on site at a wind tunnel where aircraft structures are evaluated, without the requirement for a specialized optical table with an elaborate mechanical suspension system to decouple the instrument from the vibrations set up in the structure housing the wind tunnel.

The invention is expressed both as a method and an apparatus. In first aspect, the invention is a method for phase-locked optical interferometric inspection of a surface. The method includes producing a first light beam by reflection of a coherent source beam from a target surface. Next, a second light beam is produced, the second beam including optical signal characteristics of frequency and phase. The first and second beams are mixed to produce a first interference pattern at a first image plane and a second interference pattern at a second image plane. From the second interference pattern, a control signal is derived, the control signal having frequency and phase characteristics representative of the modulation of the first light beam by the target surface. In the method, a signal characteristic of the second beam is changed in response to the control signal. In the last step, successive images are generated from the first interference pattern and combined to produce a contoured target surface image.

Significantly, the modulation of the first beam is Doppler modulation caused by movement of the target surface, and the step of changing a signal characteristic of the second beam includes modulating the frequency of the second beam substantially in synchronization with the Doppler modulation.

Important results in the produced target surface image are realized by limiting the step of mixing the first and second beams to mixing the first and second beam to produce a second interference pattern corresponding to a respective speckle in the first interference pattern. This corresponds to locking to, and tracking the frequency and phase fluctuations associated with a portion of the object surface. With achievement of the lock, not only will the practice of the method desensitize the apparatus to effects such as vibration of the work environment, it will also serve to lock to and track the frequency and phase fluctuations associated with the surface portion ("lock point") imaged in the second interference pattern. The achievement of the lock will then cause portions of the first interference pattern image having the same Doppler signature as the lock point to form high-contrast speckle in the resulting image, while the portions having differing Doppler signatures will form low-contrast speckle. The image generated by the method will result in contours of the object surface formed by demarcation between high- and low-contrast speckle.

From another aspect, the invention is embodied in an optical, phase-locked speckle pattern interferometer, which includes an image processor with a display, responsive to a succession of interference image signals for generating a sequence of interference images and for combining a successive interference images to produce a contoured target surface image on said display. An optical circuit receives a first beam of light reflected from a target surface and generates a second beam of light having signal characteristics of phase and frequency, and mixes the first and second beams of light to produce respective first and second interference patterns. A first imaging apparatus has a first imaging plane at which the first interference pattern is received and from which the succession of interference image signals is generated, each interference signal corresponding to a speckle pattern image of the target surface. A second imaging apparatus includes a second image plane for developing the second interference pattern and generating from the second interference pattern a control signal with frequency and phae characteristics for representing modulation of the first coherent beam of light by a target surface. An electro-optical locking circuit is connected to the optical circuit and to the second imaging apparatus for changing a signal characteristic of the second coherent beam of light in response to the control signal.

DETAILED DESCRIPTION OF THE PREFERRED EMBODIMENT

Figure 1:
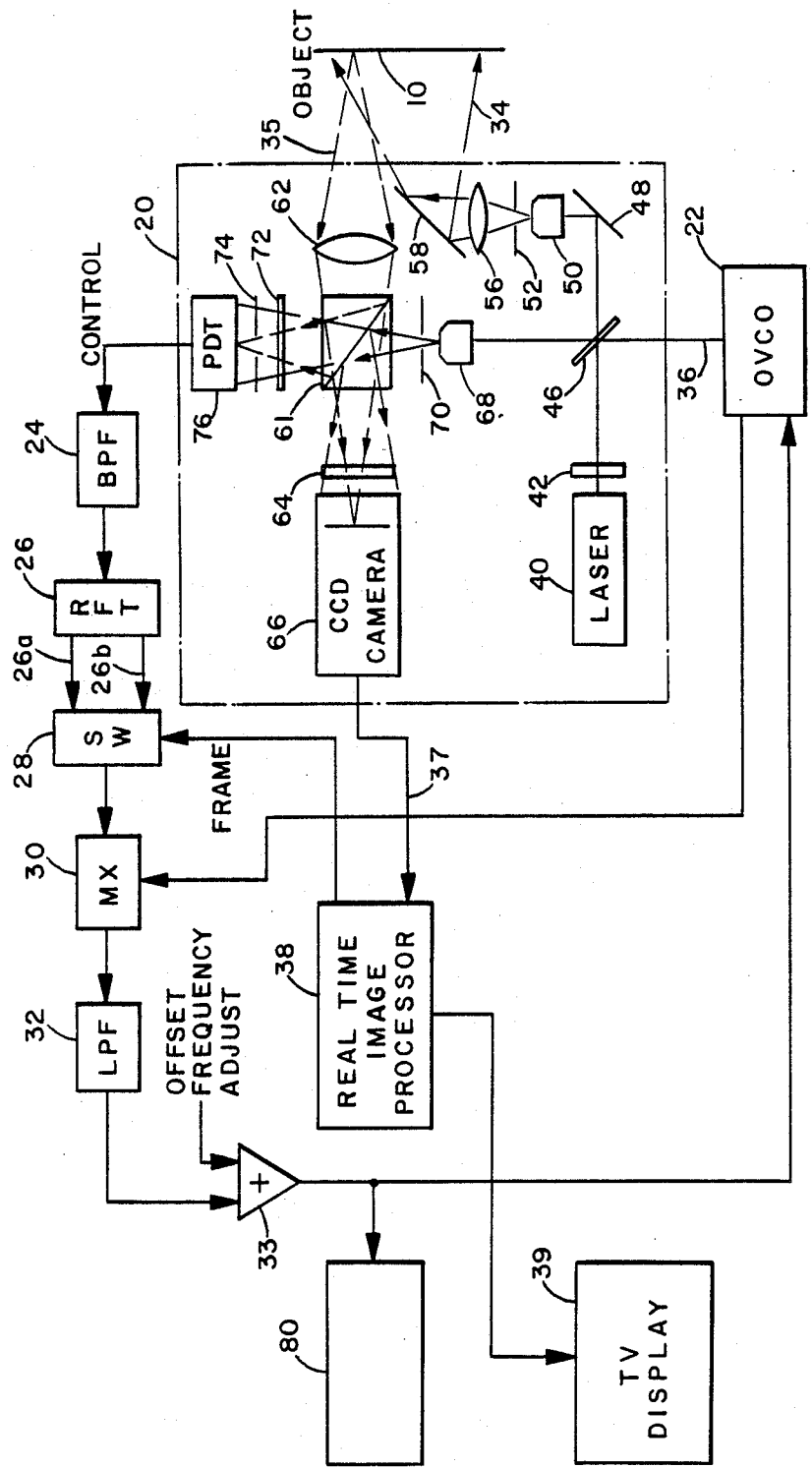
FIG. 1 is a block diagram illustrating the fundamental electrical and optical relationships of the elements of the invention.

An optically phase-locked electronic speckle pattern interferometer (ESPI) is illustrated in FIG. 1. The ESPI of the invention incorporates an optical phase-locked loop with an ESPI to produce, in real time, Doppler speckle contours of a target surface. The optically phase-locked ESPI of FIG. 1 also incorporates a video-signal processing technique utilizing local oscillator (LO) phase shifting, together with the production and combination of successive interference images to produce a contoured target surface image.

In FIG. 1, certain dynamic characteristics of an object surface 10 are to be inspected by an optically phase-locked ESPI. Preferably, the dynamic characteristics to be investigated include deformation caused by oscillation of the surface. Alternatively, the dynamic characteristics could include displacement of the entire surface, or any other dynamically changing characteristic which affects the way in which the surface reflects a beam of coherent light. In the preferred scenario, the dynamic oscillatory deformation of the object surface 10 results in the imposition of a time-varying phase modulation or Doppler signature on the coherent light reflected by the surface. In this regard, a time-varying Doppler signature corresponds to a time-varying change in frequency (color) of the light reflected by the object surface 10. To the unaided eye, the irregularities of the object surface result in the speckling of visible coherent light. If the oscillatory deformation of the object surface 10 imposes a nodal pattern on the surface, the pattern would be detected as a continuous speckle contour whose instantaneous brightness would apparently differ from other features of the surface. For example, assume the object surface 10 comprises a flexible material with stationary edges, which is disturbed by a point impulse applied periodically to the surface. The oscillatory nodal formation of the surface might appear as a group of circular, concentric speckles of constantly increasing radius.

The optically phase-locked ESPI of FIG. 1 is an instrument which detects dynamic disturbances of the object surface 10 with a complement of elements that effectively isolate the operation of the instrument from other disturbances occurring in the operational environment which are unrelated to the disturbances of interest in the object surface 10. For example, if the object surface 10 is the surface of an aircraft wing undergoing dynamic vibrational testing, the floor of the test site can receive, alter, and conduct vibrations resulting from the testing to the elements of the instrument, resulting in vibration of the instrument. As is known, the vibration of the optical elements of a prior art speckle pattern interferometer which cause sub-wavelength displacement of those elements can impose a level of background noise on the instrument which reduces its seneitivity or can render it inoperative. The structure and operational cooperation of the elements making up the optical phase-locked ESPI of FIG. 1 eliminate the need for any sophisticated mechanical suspension of the instrument to isolate it from such vibrations. As a result, the optical phase-locked ESPI of FIG. 1 can be packaged in a convenient, portable form, which can be carried to and operated at a site where the object surface 10 is being tested.

The optically phase-locked ESPI of FIG. 1 includes an optical circuit 20, an optical voltage-controlled oscillator (OVCO) 22 and a control processing loop including, a band pass filter (BPF) 24, a radio frequency transformer (RFT) 26, a high-speed switch (SW) 28, a mixer (MX) 30, a low pass filter (LPF) 32, and a summation circuit 33.

In operation, the optical circuit 20 produces a source beam 34. The source beam 34 is a beam of coherent light having frequency and phase characteristics. A first beam 35 resulting in the reflection of the source beam 34 from the surface 10 enters the optical circuit 20. A second beam is provided to the optical circuit 20 from the OVCO 22. The second beam has frequency and phase characteristics determined by the action of the OVCO 22. The second beam acts essentially as a compound local oscillator (LO) field which is provided to the optical circuit 20. The optical circuit 20 mixes the first and second beams in a manner described below. The mixing of the first and second beams results in the production of a CONTROL signal that is fed through the control loop.

The CONTROL signal is an electrical signal having frequency and phase characteristics which represent Doppler modulation of the first beam 35 by movement or deformation of the object surface 10. The CONTROL signal is fed through the BPF 24 to the RFT 26. The RFT 26 operates conventionally to provide the CONTROL signal unshifted in phase at output lead 26a, and phase-shifted by 180° ($\pi$) at signal lead 26b. The signal leads 26a and 26b are connected alternatively by SW 28 to the mixer 30. The mixer 30 mixes the phase of the CONTROL signal selected by SW 28 with a mixing signal of predetermined frequency output by OVCO 22. The mixer 30 operates conventionally to produce mixing products which are passed to the LPF 32. The output of the LPF 32 is a time-varying signal representing the time-varying Doppler modulation of the first beam 35 by the object surface 10. The time-varying signal output by the LPF 32 is combined with an offset adjustment frequency in combination circuit 33 and passed as a control input to the OVCO 22. The OVCO 22 provides the second beam 36 as a frequency and phase modulated beam of light, with the frequency and phase being locked by the operation of the OVCO 22 to the time-varying modulation of the first beam 35. As explained below, this locking action locks the operation of the optical phase-locked ESPI of FIG. 1 to the time-varying modulation of the beam 35, which effectively isolates the operation of the instrument from noise caused by mechanical vibrations picked up by the ESPI of FIG. 1 from the operational environment.

Another product of the mixing of the first and second beams in the optical circuit 20 is a succession of interference image signals that is passed on signal line 37 to a conventional real time image processor 38. Each interference image signal provided on the signal line 37 has the form of a conventional frame, suitable for display on a raster-scanned display such as a CRT. The interference image signals are provided at a standard frame rate to the processor 34. The processor, at the frame rate, conventionally combines successive frames to produce a sequence of processed frames that are provided to a conventional TV display 39. In response to the sequence of processed frames, the TV display 39 produces a contour image of the object surface 10.

The frame rate at which the real time image processor 38 combines successive interference image signals is synchronized by a FRAME signal which operates the switch 28. Thus, the switch alternates between the signal leads 26a and 26b of the RFT 26 at the frame rate of the interference image signals on the signal line 37. This synchronizes the operations of the real-time image processor 38 in such a manner as to produce an enhancement of the image of the surface produced by the TV display 39, as explained below.

In more detail, the optical circuit 20 of FIG. 1 includes a laser 41, which can compirse a conventional semiconductor laser operated in the near infrared. The laser 41 produces a beam of coherent light which passes through a conventional half wave plate 42 to adjust the polarization state of the beam. The beam is split by a conventional beam splitter 46 into two components. One of the two components is deflected by a reflecting mirror 48, through a microscope objective 50 and a pinhole aperture 52. The first component is then collimated by a lens 56 to obtain a broad uniform flood beam of light. The broad beam is transformed into the source beam 34 by reflection from a steering mirror 58. The source beam 34 illuminates the object surface 10, which is assumed to be a diffuse reflector.

The first beam 35, produced by relection of the source beam from the object surface 10 is imaged by the lens 60. The image of the object surface 10 carried by the focused beam 35 is directed by the lens 60 through a conventional beam splitting cube 61. The beam splitting cube 61 subdivides the beam 35, thereby forming two orthogonal image planes. Each of the image planes embodies a laser speckle pattern. The face plate of a conventional CCD (charge-coupled device) television camera 66 occupies a first of the image planes.

As is known, a CCD camera such as the camera 66 is an integrating device which conventionally samples the entire optical image on the image plane of its faceplate and converts the sample into a electrical signal reprsenting a video frame. The CCD camera samples at a frame rate, thereby producing a succession of signals, each constituting a frame representing an instanteous image of the object surface 10.

The second image plane is reached through a second polarizing filter 72 and is occupied by the faceplate of an electro-optical photo detector (PDT) 76 whose field of view is limited by a pinhole 74. The pinhole serves to detect only a portion of the image field detected by the imager 66. The pinhole is directed by conventional means to observe a portion of the object surface image which includes a single speckle. The size of the pinhole in the apperature 74 is chosen to limit the field of view of the detector 76 to an area of the image which is slightly less than an average speckle. Conventionally, the field of view of the point detector 76 can be limited to that of a single pixel of the image developed by the imager 66. The portion of the image observed by the detector 76 consitutes a "lock point" on the image viewed by the imager 66. Although not shown in FIG. 1, the location of the lock point in the image field can be changed by a mechanism which selectively positions the pinhole aperture 74 in the second image plane. Preferably, the aperture can be selectively positioned to observe a lock point anywhere in the image plane. Alternatively, a steering mirror can position any portion of the image at the location of a fixed pinhole.

The second laser beam portion split off by the beam splitter 46 is directed to the OVCO 22 to be processed thereby and returned through the beam splitter 46 to the optical circuit 20. The OVCO 22 processes the second portion in such a manner as to provide the second beam 36 as a frequency and phase modulated local oscillator (LO) beam. The second beam passes through the beam splitter 46 and a combination consisting of a microscope objective 68 and a pinhole aperture 70. When it emerges from the pinhole aperature 70, the second beam exhibits a uniform, diverging LO wavefront whose frequency is selectively shifted to track the Doppler signature of the lock point speckle. The frequency shifted LO second beam is mixed by the beam splitting cube 61 with the speckle pattern images presented by the first beam to the imager 66 and the photo detector 76. The mixing of the two beams forms an interference image including an active speckle pattern which is sensitive to Doppler shift produced in the first beam 35 by motion of the object surface 10. As is known, when the first and second beams are mixed in this manner, the time-varying Doppler shift imposed on the first beam 35 by displacement of the object surface 10 is manifested as time-varying intensity ("scintillation") in the mixing result. Thus, the interference images formed at the two image planes represent the deformation or movement of the object surface 10 as variations in intensity in the image. This variation is manifested as a scintillation of each individual speckle in the imgae plane at a rate given by the Droppler frequency shift associated with the motion of the area producing the speckle (the conjugate object area). The detector 76, whose aperature is equal to or less than an average size of an image speckle, generates an electrical analogue of the scintillating irradiance associated with a particular image field speckle. This electronic signal (CONTROL), has a modulation characteristic corresponding to the Doppler signature for the lock point speckle. The CONTROL signal is subjected to the processing sequence described above to produce a relatively low frequency signal fed to the OVCO to modulate the frequency of the local oscillator wavefront of the second beam, which is mixed by the beam splitting cube 61 with the first beam 35.

Since the CONTROL signal provided to the OVCO 22 is derived from the lock point speckle observed by the photo detector 76, the optical, phase-locked ESPI of FIG. 1 manifests a sensitivity to any individual speckle in the first image plane observed by the imager 66 which scintillates at a rate given by the Doppler frequency shift associated with motion of the lock point creating the speckle observed by the detector 76. Once the OVCO locks the local oscillator wavefront to the frequency and phase fluctuations associated with the lock point speckle, portions of the integrated image observed by the CCD camera 66 which have the same "temploral" Doppler signature as the lock point will be coherently detected. The result will be that the coherently detected portions of the interference image at the faceplate of the CCD camera 66 will form high-constract speckle, while those that have a different Doppler signature than the lock point will be incoherently detected and form low-constrast speckle. The demarcation between the high and low contrast speckle defines contours of equal Doppler signature. The real-time processing performed by the image processor 38 using sequential frame substraction dramatically increases the visibilty of the Doppler contours.

Figure 2:
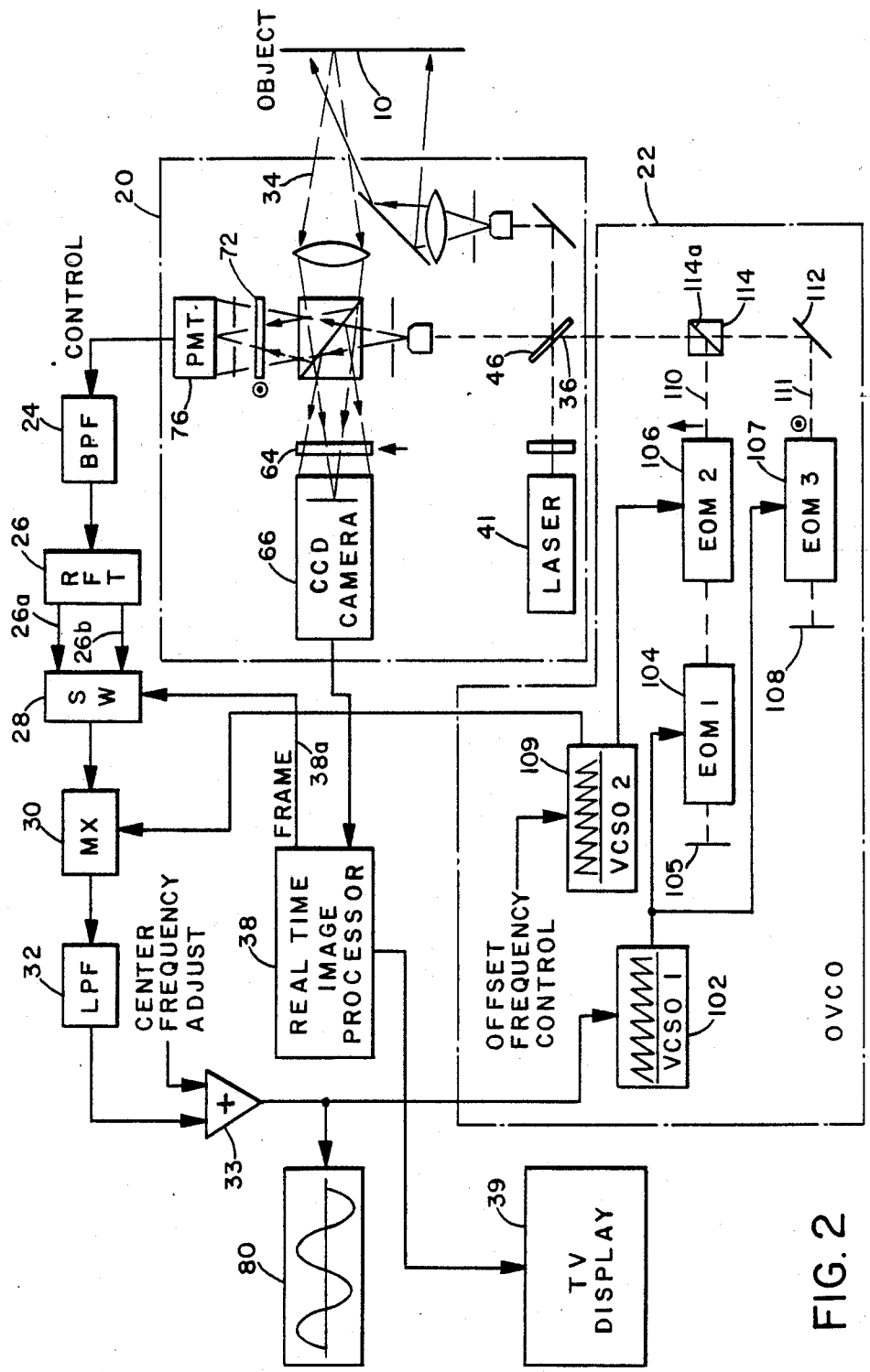
FIG. 2 is a block diagram illustrating a preferred embodiment of the optically phase-locked speckle pattern interferometer of FIG. 1.

Refer now to FIG. 2 for a particular embodiment of the invention in which the OVCO 22 and the processing loop consisting of elements 24, 26, 28, 30, 32, and 33 form an optical phase-locked loop which locks the operation of the FIG. 1 ESPI to time-varying scintillation of the image field speckle observed by the photo detector 76. In FIG. 2, the optical voltage controlled oscillator 22 includes an electrical voltage controlled saw tooth oscillator (VCSO 1) 102 that controls elements producing a first local oscillator field. These elements include a first electro-optical modulator (EOM 1) 104, reflecting mirror 105 and a second electro-optical modulator (EOM 2) 106. The VCSO 102 also controls elements which produce a second local oscillator field, the elements including a third electro-optical modulator (EOM 3) 107 and a reflecting mirror 108. A second voltage controlled saw tooth oscillator (VCSO 2) 109 controls the EOM 106. The three electro-optical modulators 104, 106, and 107 are configured as optical frequency shifters which employ a serrodyne technique to modulate the frequency and phase characteristics of first and second local oscillator fields included in the second beam 36. The serrodyne technique is described in detail in Cummings' article in the PROCEEDINGS of the IRE 175 (Feb., 1957) entitled "The Serrodyne Frequency Translator". In the FIG. 2, a embodiment, a Cummings-type serrodyne technique is used to determine the instanteous frequency of the first and second local oscillator fields in the OVCO 22 by adding to the initial frequency of each field the time derivative of the phase of the field, divided by 2 radians. The effect of such phase modulation is to shift the frequency of each local oscillator field by a fixed amount. The application of a sawtooth wave to an electro-optic phase modulator produces a sawtooth phase modulation of the light produced by the modulator. The effect of this modulation is to produce a fixed frequency shift in the light of each local oscillator field, the value of the shift being equal to the frequency of the modulating sawtooth waveform. Since the most efficient frequency shifting of the local oscillator fields requires that the phase shift attain a maximum value of 2 radians at the end of each sawtooth, the mirrors 105 and 108 are used to operate the electro-optical modulators 104, 106, and 107 in the double pass mode, imposing one-half of the desired $2\pi$ phase, shift, i.e., $\pi$, with each pass. The first VCSO 102 is driven with the CONTROL signal in the form resulting from the low pass filtration by LPF 32.

Since, at this point, the CONTROL signal corresponds essentially to time-varying Doppler modulation of the first beam 34, the electro-optical modulators 104 and 107, which are controlled by the VCSO 102, impose a frequency shift which reflects the time-varying Doppler signature of the speckle irradiance detected by the photo detector 76. (In FIG. 2, photo detector 76 is presented as a photomultiplier tube "PMT"). Thus, the OVCO 22 provides a linear relationship between the voltage applied to the VCSO 102 and the frequency shift imposed on the first beam 34 by the lock point speckle. The modulator configured in this manner can either upshift or downshift light frequency, depending on whether a positive or negative slope saw tooth is produced by the VCSO. To track both positive and negative Doppler shifts, a fixed frequency downshift is introduced by the VCSO 109 whose value lies in the center of the frequency range of the VCSO 102.

In specific detail, the OVCO 22 receives a portion of the coherent output of the laser 41 reflectead to the OVCO by the beam splitter 46. The portion is subdivided by a polarizing beam splitter 114 into two local oscillator field beams 110 and 111, one provided to the electro-optical modulators 104 and 106, the other to the electro-optic modulator 107 by way of a reflecting mirror 112. The polarizing beam splitter 114 separates the beam portion into orthogonally distinct (polarized) components comprising the first and second local oscillator field beams. The first component is directed on an optical path through electro-optical modulators 106 and 104; the beam is reflected by the mirror 105 through the modulators 104 and 106 back to the polarizing beam splitter 114 wherein a partially reflecting mirror 114a redirects the modulated, polarized first local oscillator field beam back through the partially reflecting mirror 46 to the beam splitting cube 61. The second component is modulated by two passes through the electro-optical modulator 107 operating in conjunction with the reflecting mirrior 108. The first electro-optical modulator 104 upshifts the frequency of the first local oscillator field beam over a predetermined range. Preferably, the inventor has utilized a range of 5-15 MH$_Z$, with a positive sloped sawtooth from VCSO 102. The second electro-optical modulator 106 downshifts the frequency by a fixed amount with a negative sloped saw tooth from VCSO 109. The value of this fixed frequency offset is tuneable using an offset frequency control. Nominally, for the preferred range produced by VCSO 102, the VCSO 109 is set at 10 MH$_Z$. The resulting tracking range of the OVCO 22 for the first local oscillator field beam is then from $-5$ MH$_Z$ to $+5$MH$_Z$. This is manifested as a modulation on the frequency of the first local oscillator field beam over the tracking range.

The second local oscillator field beam has its frequency modulated by the VCSO 102, without the downshifting produced by the VCSO 109 and the modulator 106. This beam consists of a field that is orthogonally polarized from the polarization state of the first local oscillator field beam 110. The orthogonal distinction of the beams 110 and 111 is illustrated in FIG. 2 by the upwardly directed arrow adjacent the beam 110 and the circled dot adjacent to beam 111.

The first and second local oscillator field beams 110 and 111 are recombined by the polarization beam splitter 114 to produce a beam 118 having a first local oscillator field which is polarized by 90° with respect to the second local oscillator field. This results information of two local oscillator fields within the second beam 36. The combined fields are mixed by the block 61 with the first beam 34. The polarizing filters 64 and 72 serve to direct the first local oscillator field to the first image plane at the CCD camera 66 and the second local oscillator field to the second image plane on the face of the PMT 76. The VCSO 109 is adapted also to produce a sinewave which is frequency-and phase-locked to the sawtooth provided to the electro-optical modulator 106 to the electronic mixer 30.

In the configuration of FIG. 2, the CONTROL signal has frequency and phase characteristics determined by the scintillation of the lock point speckle detected by the PMT 76. Since the PMT 76 receives an interference image created by mixing the first beam 34 with the second local oscillator field, the CONTROL signal operates about an intermediate frequency (IF) determined by the combination of the second local oscillator field controlled by the VCSO 102 alone, and the Doppler-shifted first beam 34. The IF is in the center of the passband of the BPF 24, which strips from the CONTROL signal low frequency image irradiance components from the coherent Doppler signal detected by PMT 76. This desensitizes the optical phase-locked loop illustrated in FIG. 2 to changes in the amplitude of the image field carried by the beam 34, which might cause the loop to lose lock. As is known, such changes in amplitude can comprise low-frequency components generated by changes in the reflectivity of the object surface, or in fluctuations in the power level of the laser 41. Such fluctuations might be perceived by the loop to be changes in reflective light frequency, even though not produced by a Doppler shift. Thus, the effect of the BPF 24 is to lock the loop only to coherent Doppler image information to be displayed within the relatively narrow pass band of the CCD camera 66, while the PMT 76 operates about the intermediate frequency.

The products of the mixing operation performed by the mixer 30 in combining the offset control frequency with the band-pass filtered CONTROL signal essentially sets the IF at which the PMT 76 operates at the offset frequency of the VCSO 109. After band-pass filtering and mixing, the Doppler signal of the lock point speckle observed by the PMT 76 is low-pass filtered by the LPF 32. The low-pass filtered signal is applied, together with a frequency adjustment signal to the summation circuit 33, which allows voltage tuning of the center of the optical phase-locked loop's capture range over its full tracking range, which facilitates locking. The signal from the summation circuit 33 is applied to the VCSO 102 to complete the optical phase-locked loop. An oscilloscope 80 connected to the output of the summing circuit 33 would display a waveform corresponding to the time-varying Doppler shift of the lock point speckle detected by the PMT 76. This varying waveform varies the frequency and phase of the sawtooth generated by the VCSO 102, thereby locking the frequency modulation of the first and second local oscillator field beams 110 and 111 to the Doppler shift of the lock point speckle.

The function of the real-time image processor 38 is conventional, comprising essentially substraction of adjacent frames in the sequence of intereference pattern image frames produced by the CCD camera 66 and performing a modulus operation on the resultant image. Thus, if the CCD camera produces the sequence F1 F2 F3 ... FN, where F denotes frame and N denotes the position of the frames in the sequence, the processor 38 produces frames by subtracting successive frames in the sequence and performing the absolute value operation. Thus, the first frame produced by the processor 38 would result in the subtraction of frame 2 from frame 1, the second frame from the subtraction of frame 3 from frame 2, and so on. The subtraction is performed at the frame rate of the CCD camera 66, which means that the processor 38 produces processed image frames at the same frame rate R delayed in time by 1/R. The processor 38 conventionally produces a FRAME signal on signal line 38a, which is a stream of pulses occuring at the frame rate of CCD camera 66. The FRAME signal operates switch 28 at the frame rate to alternately connect the input of the mixer 30 to output lines 26a and 26b of the RFT 26. The effect is to periodically invert the phase of the CONTROL signal by $\pi$ radians. The two outputs from the RFT 26, which differ in phase by $\pi$ radians are toggled at the port of the mixer 30, which periodically inverts the phase of the signal that drives the VCSO 102.

The resulting phase-locked exposure (E) is given by equation (1).

$$E(\bar{r},\bar{r}_o) = T[H_b(\bar{r})] \pm 2T[H_L(\bar{r})H_I(\bar{r})]^{\frac{1}{2}}\text{COS}[\theta(\bar{r},\bar{r}_o)] \cdot J_o[B(\bar{r},\bar{r}_o)] \quad (1)$$

where:
T = video frame time
$\bar{r}$ = a vector to any point in the image field of the CCD
$\bar{r}_O$ = a vector to the lock point
$H_b(\bar{r})$ = nonchoerent irradiance
$H_L(\bar{r})$ = LO irradiance at $\bar{r}$
$H_I(\bar{r})$ = image irradiance at $\bar{r}$ $\theta(\bar{r},\bar{r}_o)$ is the phase difference between the point $\bar{r}$ and the lock point $\bar{r}_o$
$J_o[B(\bar{r},\bar{r}_o)]$ is a Bessel function on the first kind Equation (1) conventionally establishes the total phase-locked exposure produced by the integration of an image field during a frame time (T) of the CCD camera 66. In this regard, the exposure is dependent upon a first term including $H_B$, which is the non-coherent irradiance in a frame resulting from the scintillation of speckles whose Doppler signatures differ from that the lock point speckle. The total exposure of speckles having Doppler signatures equal to that of the lock point speckle is given by the second term of Equation (1), which includes an irradiance $H_L$ term resulting from mixing the first and second beams in the FIG. 2 OPL-ESPI. The second term of the exposure equation also includes the image irradiance $H_I$ in the first beam. The + signs and − signs correspond to the 0 and $\pi$ radian phase shifts imposed on the CONTROL signal by the RFT 26. These signs alternate from frame to frame.

The significance of Equation (1) in view of the frame processing done by the image processor 38 can be understood now with reference to equations (2a–2d):

$$E(\bar{r},\bar{r}_O) = C \pm D \quad (2a)$$

$$E(\bar{r},\bar{r}_O)_N = C + D \quad (2b)$$

$$E(\bar{r},\bar{r}_O)_{N+1} = C - D \quad (2c)$$

$$E(\bar{r},\bar{r}_O)_R = |E(\bar{r},\bar{r}_O)_N - E(\bar{r},\bar{r}_O)_{N+1}| \quad (2d)$$

Equation (1) has the general form given by Equation (2a), with G corresponding to the first, and D to the second term of Equation (1). The term D is added or subtracted as determined by the setting of the switch 28. Thus, the total exposure, if given in frame N by Equation (2b), will be given in frame N+1, by Equation (2c). The image processor 38 combines frame N with frame N+1 to produce a resulting frame R having an exposure given by equiation (2d). The total exposure of the resulting frame R is given by equation (3).

$$E(\bar{r},\bar{r}_O) = 2D \quad (3)$$

where: $D = 2T[H_L(\bar{r})H_I(\bar{r})]^{\frac{1}{2}}\text{COS}[O(\bar{r},\bar{r}_o)]J_o[B(\bar{r},\bar{r}_o)]$ As can be seen, the exposure in the interference image of the resulting frame R produced by the image processor 38 has the effect of doubling the contribution of the coherently-detected speckles, while cancelling the irradiance of the non-coherent speckles and incoherent background.

With this explanation of the processing performed by the image processor 38, one will appreciate that the background terms will be removed from the contoured target surface image produced by the display 39, thereby producing a dark background in the image, while the exposure of the coherently detected equal Doppler contours is doubled. Clearly, this technique enhances the signal to noise ratio (SNR) of the image produced by the display 39, since each resulting frame contains signal information derived from the vibration or displacement of the object surface 10. Recalling the example of a point impulse disturbance of the object surface 10, one will appreciat790 respresented on the display 39 in FIG. 2 illustrates contours corresponding to the concentric vibrational peaks induced in the surface 10. If the object surface 10 is, for example, a circular speaker cone, the Doppler speckle contour produced by the display 39 is a pattern showing a significant part of the speaker cone moving in phase with the same frequency and a spacially invarient peak amplitude.

In specifying that the second image plane observed by the PMT 76 can be selectively positioned on the interference pattern produced by mixing the first and second beams, it will be appreciated that the instrument will be able to explore the detail of subsidiary equal Doppler contours.

Figure 3:
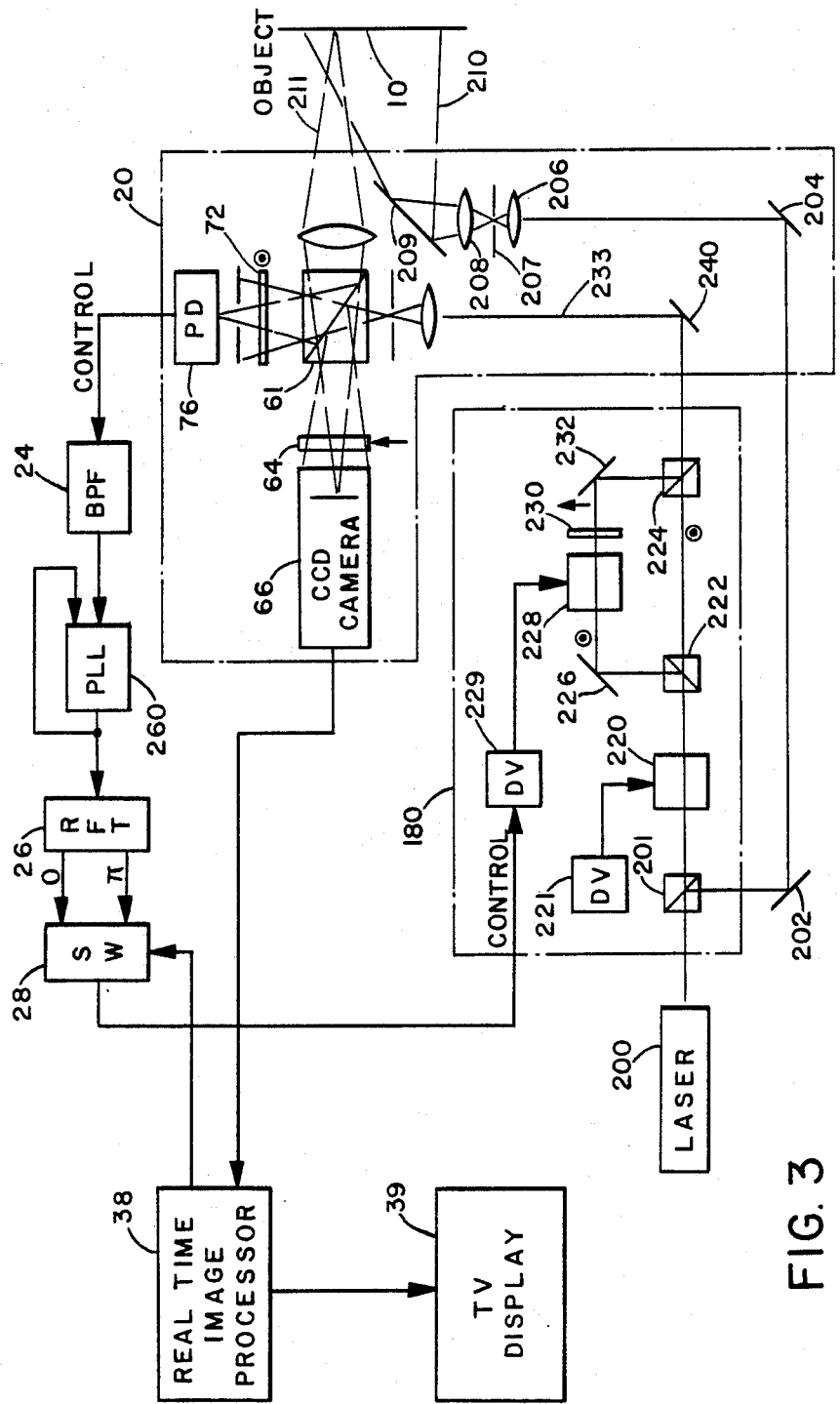
FIG. 3 is a block diagram illustrating an embodiment of the optical speckle pattern interferometer having a local oscillator field which is phase strobed with object surface modulation.

Refer now to FIG. 3 for a second embodiment of the invention which operates by synchronously strobing a local oscillator field of the second beam by $\pi$ radians in synchronism with both the lock point Doppler signature and the video frame rate. The result of this dual synchronous phase strobing of the local oscillator field, coupled with sequential frame subtraction in the real-time image processor generates equal Doppler contours which are equivalent to those generated by the interferometer of FIG. 2.

In the phase-strobed ESPI of FIG. 3, elements indicated by reference numerals discussed above in reference to FIGS. 1 and 2 indicate identical elements. Thus, the optical circuit 20 BPF 24, RFT 26, switch 28, real-time image processor 38, and TV display 39 are all the equivalent of identically-referenced elements in FIGS. 1 and 2. In addition, the object surface being inspected is indicated by reference numeral 10 to indicate correspondence between the surface and the target surface of FIGS. 1 and 2. In FIG. 3 a laser 200 provides an optical beam which is separated into first and second beam componets by a beam splitter 201. The source beam is reflected off of mirrors 202 and 204 and filtered by a lens 206, a pinhole aperature 207 and then collimated by a lens 208 to obtain a broad uniform source beam which illuminates the object surface 10 after reflection from a steering mirror 209. The source beam is indicated by 210 and the first beam, resulting in reflection of the source beam, by reference numeral 211.

The second beam is derived by projection of a portion of the light emitted by the laser 200 that is transmitted through the beam splitter 201 through a frequency shifter, which can comprise an electro-optical modulator driven by a driver 221.

The combination of the driver 221 and modulator 220 imposes a fixed up shift in frequency on the beam passing through the modulator. The frequency-shifted beam is split in a beam splitter 222 into a first and second portion, the first of which passes a phase strobing element 228, comprising an electro-optical modulator driven by a driver 229 which responds to the CONTROL signal output by the switch 28. The electro-optical modulator 228 operates conventionally to shift the phase of the beam. A halfwave plate 230 rotates the state of polarization of the beam by 90° to produce a polarized beam having a sense indicated by the upward pointing arrow adjacent the halfwave plate 230. It should be mentioned that the beam splitter 222 is also a polarizing beam splitter, which establishes the state of polarization of the subdivided portions as indicated by the circled dots between the element 222 and 224 the elements and 226, respectively. The second portion of the beam split by the beam splitter 222 is recombined in a polarization beam splitting cube 224 with the orthogonally distinct first portion, which is reflected to the cube 224 off of the mirror 240. The recombined beam 233 consists of two orthogonally polarized, local oscillator fields. It should be evident that, in the beam 233, the field indicated by the circled dot is only frequency shifted, while the component indicated by the upwardly pointing arrow is shifted in both frequency and phase. The second beam 233 is split into two components by the beam splitting cube 61, with the polarization filters 64 and 72 functioning as described above, with reference to FIGS. 1 and 2. The beam splitting cube 61 also splits the first beam as described above so that a first interference pattern, resulting from mixing of the first beam with the upwardly-polarized local oscillator field of the second beam, is generated at the first image plane on the phase plate of the CCD camera 66. Similarly, a second interference pattern, corresponding to the image of a speckle produced by mixing the second local oscillator field with the first beam, is produced at the photodetector 76.

Figure 4:
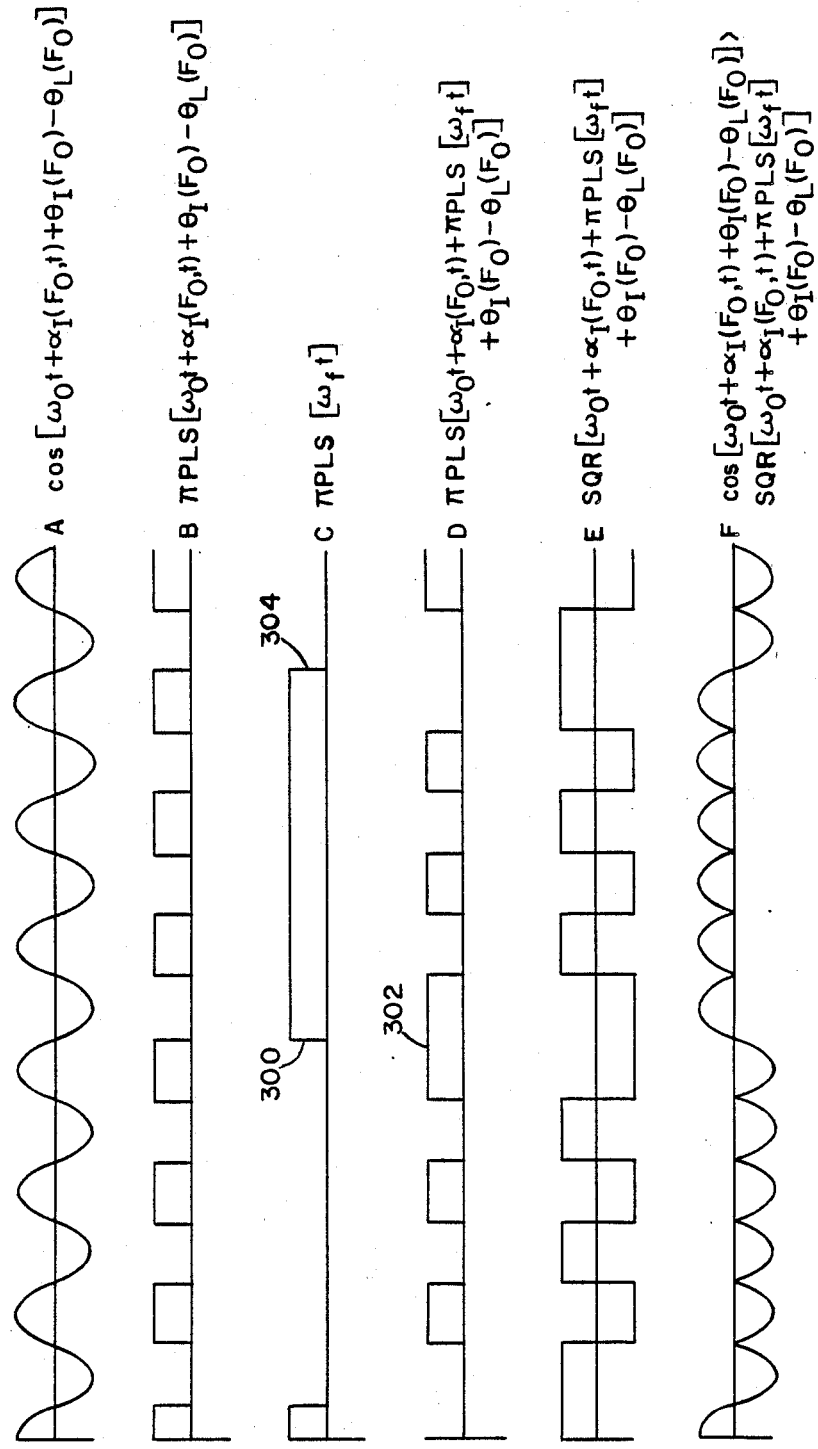
FIG. 4 is a set of wave form diagrams illustrating the operation of the FIG. 3 interferometer.

As will be appreciated, the CONTROL signal produced by the point detector 76 corresponds to the imposition of a modulation representing the lock point Doppler signature on an IF signal having a frequency equal to the up shift frequency amount resulting from the operation of the modulator 220. The principle purpose of this frequency offset is to prevent synchronous detection by the imager of odd harmonics of the lock-point Doppler signature. The CONTROL signal is pass band filtered by BPF 24 and presented to a phase-lock loop (PLL) 260. PLL 260 is an electronic component, conventional in all respects, which converts the CONTROL signal to a pulse signal, fed to the RFT 26. As in FIGS. 1 and 2, the RFT 26 operates to provide an output at 26a corresponding to the unshifted output of the phase-locked loop 260 and an output at 26b corresponding to the output of the PLL 260 shifted by $\pi$ radians. The switch 26 is operated by the FRAME signal from the real-time image processor 38 to alternately connect the shifted and unshifted PLL output to the driver 229. In either form, the driver 229 shifts the phase of the first local oscillator field in synchronism with the modulation of the CONTROL signal, which represents the Doppler signature of the speckle imaged by the point detector 76. In synchronism with the frame rate of the CCD camera 66, the phase of the CONTROL signal is selectively inverted by 180°. In FIG. 4, waveform A represents the CONTROL signal as produced by the point detector 76. As illustrated, waveform A is a sinusoid having a base frequency which is varied by the time-varying Doppler signature of the imaged speckle. The CONTROL signal is converted to pulse form (waveform B in FIG. 4) and presented to the RFT 26. The state of the switch 28 is given by waveform C in FIG. 4. As illustrated, the switch state alternates at the frame rate in response to the frame signal produced by the image processor 38. The format of the CONTROL signal at the output of the switch 28 is illustrated in FIG. 4 by waveform D. As shown, prior to the transition 300 in the state of the switch (waveform C), the CONTROL signal is in phase with the output of PLL 260. A FORMAT pulse produced by the image processor 38 causes the switch state to transition at 300 in waveform C, thereby causing the switch 28 to select output 26b of the RFT. The result is to elongate the pulse 302 in waveform D, thereby shifting the phase of the CONTROL signal by $\pi$ radians. This phase of the CONTROL signal is maintained until the next FORMAT signal causes transition 304, in waveform C, which shifts the phase of waveform D to the phase provided on signal lead 26a by the RFT 26. As a result of waveform D, the driver 229 and the phase shifting modulator 228 produce a first local oscillator field whose phase is synchronized to the phase of waveform D. In the optical domain, the result is represented by the square wave of waveform E.

As a result of the phase modulation of the first local oscillator field in the second beam (represented by waveform E in FIG. 4) the CCD camera 66 detects only the lock point Doppler signature. The result is coherent detection of the lock-point Doppler signature by synchronous rectification of the interference image produced at the first image plane. This is represented by waveform F. In addition, since the same local oscillator field is also applied to the entire image detected at the first image plane, portions of the image field of view which have the same time-varying Doppler signature as the lock point will also by synchronously rectified, coherently detected, and form high-contrast speckle, while those that are not synchronously rectified are incoherently detected and form low-contrast speckle. As with FIG. 2, the demarcation between those portions of the interference image at the first image plane which contain low- or high-contrast speckle defined contours of equal Doppler signature.

Waveform F represents the output of the CCD camera 66. As is evident from waveform F, the algebraic sign of the coherently detected speckle will alternate at the frame rate, which is not true of the noncoherent speckle and incoherent background. Consequently, subtraction of successive frames in the real-time image processor 38 as described above will enhance the coherently detected speckle in the resulting frames, while canceling the incoherent speckle.

The ESPI embodiments illustrated and described above, when realized in conventional instrumentation packages, support an optically phased-locked or a synchronously phased-strobed ESPI sensor generating real-time equal Doppler speckle contours of vibrating objects from unstable sensor platforms. The phase locking employed in both embodiments not only compensates for the deleterious effects of ambient background vibration but also provides the basis for a novel ESPI video signal processing technique which produces high-contrast speckle contours. The ability to locate the ESPI lock point anywhere within the field of view of the sensor also allows examination of the spatial detail of low-contrast speckle contours whose low visibility would otherwise make interpretation difficult. Since both embodiments of the ESPI instrument have local oscillator phase modulation capability, they offer the potential for detection of vibrations with amplitudes significantly less than 1/100 of a wavelength.

Refer now to FIGS. 5-8 for an understanding of variations of the embodiments illustrated and discussed here-in above. In these figures, elements indicated by reference numerals illustrated and discussed above in reference to FIGS. 1-3 indicate identical elements.

Figure 5:
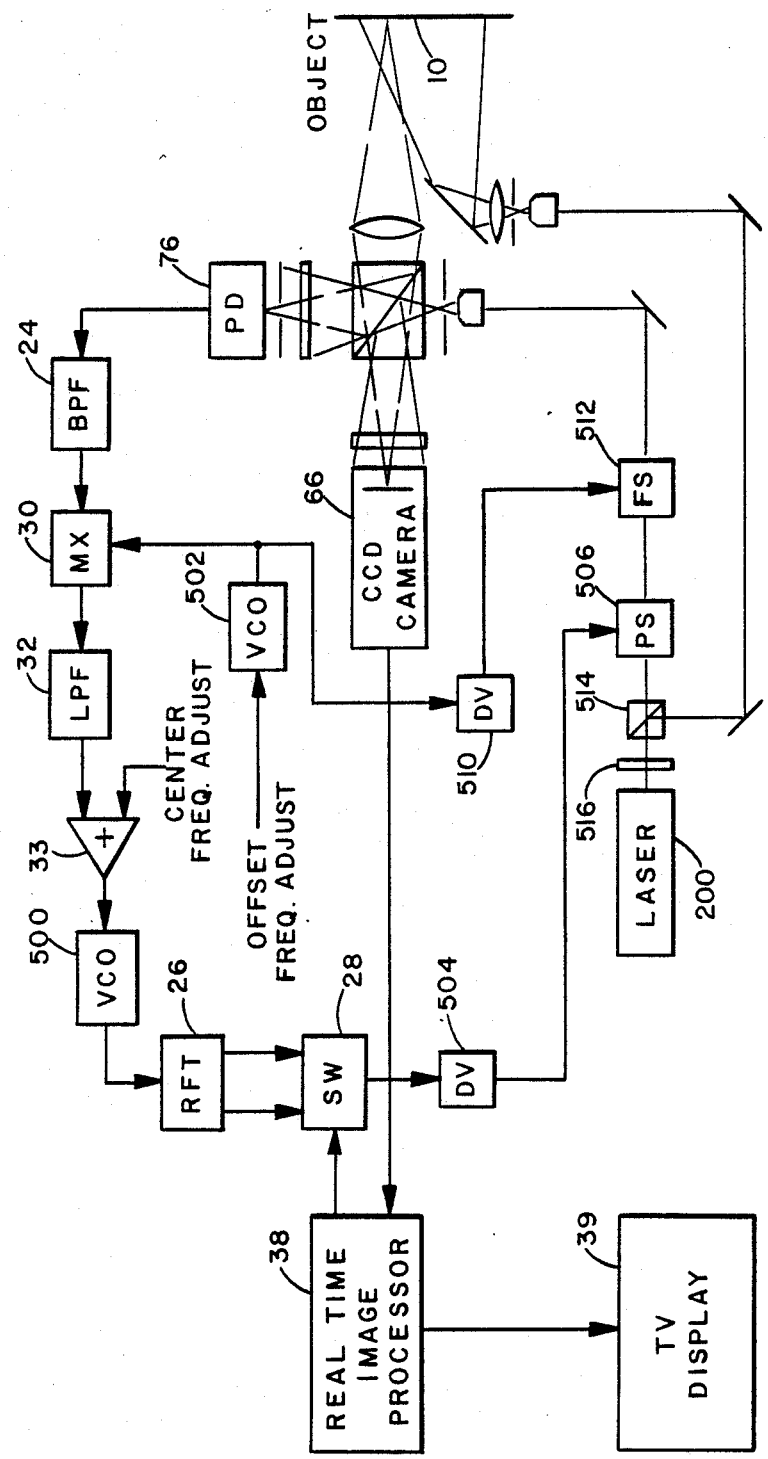
FIG. 5 is a block diagram illustrating an embodiment of the invention having a local oscillator field in a second beam which is phased-strobed with object surface modulation, with the strob field being applied to each of two image planes.

In FIG. 5, a phase-strobed and frequency-shifted local oscillator field is delivered not only to the first image plane at the face plate of the CCD camera 66, but also to the second image plane on the face plate of the photodetector 76. In the embodiment of FIG. 3, the second beam included two orthogonally distinct local oscillator fields. In FIG. 5, the FIG. 3 embodiment is adapted to provide a single local oscillator field in the second beam whose phase is selectively inverted as taught with reference to FIG. 3. In FIG. 5, the mixer 30, in series with the LPF 32 and summation circuit 33 is connected in series between the bandpass filter 24 and a voltage-controlled oscillator (VCO) 500 which corresponds in form and function to the PLL 260 of FIG. 3. In FIG. 5, a second voltage controlled oscillator (VCO) 502 operating at a predetermined offset frequency provides an offset frequency signal to both the mixer 30 and a conventional driver 510. The offset frequency signal is used by the driver to operate a conventional electro-optical frequency shifter 512 which shifts the frequency of the second beam local oscillator field by an amount equal to the IF frequency of the control loop. The VCO 500 operates to produce an output pulse string in the same manner as PLL 260, with the pulse string passed through the RFT 26 and switch 28 as described above in reference to FIG. 3. The driver 504 receives the CONTROL signal provided by the switch 28 to operate the electro-optical phase shifter 506 to strobe the phase of the second beam local oscillator field in the manner described above in reference to FIG. 3. The laser 200 provides the second beam through a rotatable half-wave plate 516, and a polarizing beam splitter 514. The second beam has its phase strobed as described above in reference to FIG. 3, and has its frequency shifted, also as described above in reference to FIG. 3. The second beam thus corresponds to the first local oscillator field delivered, in the FIG. 3 embodiment, to the first image plane. Instead of creating a second, orthogonally distinct local oscillator field without the phase strobing of the first local oscillator field, the embodiment of FIG. 5 delivers the same phase-strobed, frequency-shifted second beam local oscillator field to the first and to the second image planes at the CCD camera 66 and the photodetector 76, respectively. Since there is only a single local oscillator field in the second beam in FIG. 5, the polarizing elements 64 and 72 of FIG. 3 are not present in the embodiment of FIG. 5.

The system of FIG. 5 delivers a phased-strobed and frequency-shifted second beam local oscillator field to both image planes. Unlike the embodiment of FIG. 3, the embodiment of FIG. 5 is more nearly an optically, phased-locked loop, which uses the photodetector 76 as a switching mixer. The switching mixer operation of the photodetector 76 is obtained as a consequence of the phase strobing of the local oscillator field at the second image plane. As with FIG. 3 (and with the first image plane in FIG. 5), the phase of the local oscillator field at the second image plane is strobed by $\pi$ radians in synchronism with the pulse wave form provided by the switch 28 to the driver 504. The CONTROL signal output by the PDT 76 now contains sinusoid terms with frequencies equal to the sum and difference between the Doppler signature of the lock-point speckle and the frequency of the pulse waveform output by the switch 28. Also present in the CONTROL signal are odd harmonics of those frequencies. Since the CONTROL signal is the drive signal for the VCO 500, the VCO 500 is driven by the switching mixer output, after bandpass filtration through the BPF 30, downmixing in the mixer 30, low pass filtration in the LPF 32, and summation with the center frequency adjust voltage in the summing circuit 33. The filtering action of the LPF 32 and BPF 24 remove the odd harmonic and the sum frequency component from the CONTROL signal. The offset frequency generated by the VCO 502 (a sinusoid) is applied both to upshift the frequency of the second beam local oscillator field and to produce mixing components with the pass band filtered CONTROL signal output by the BPF 24. This establishes the offset IF lock-point of the PDT 76, as described above in relation to FIGS. 1 and 2.

Figure 6:
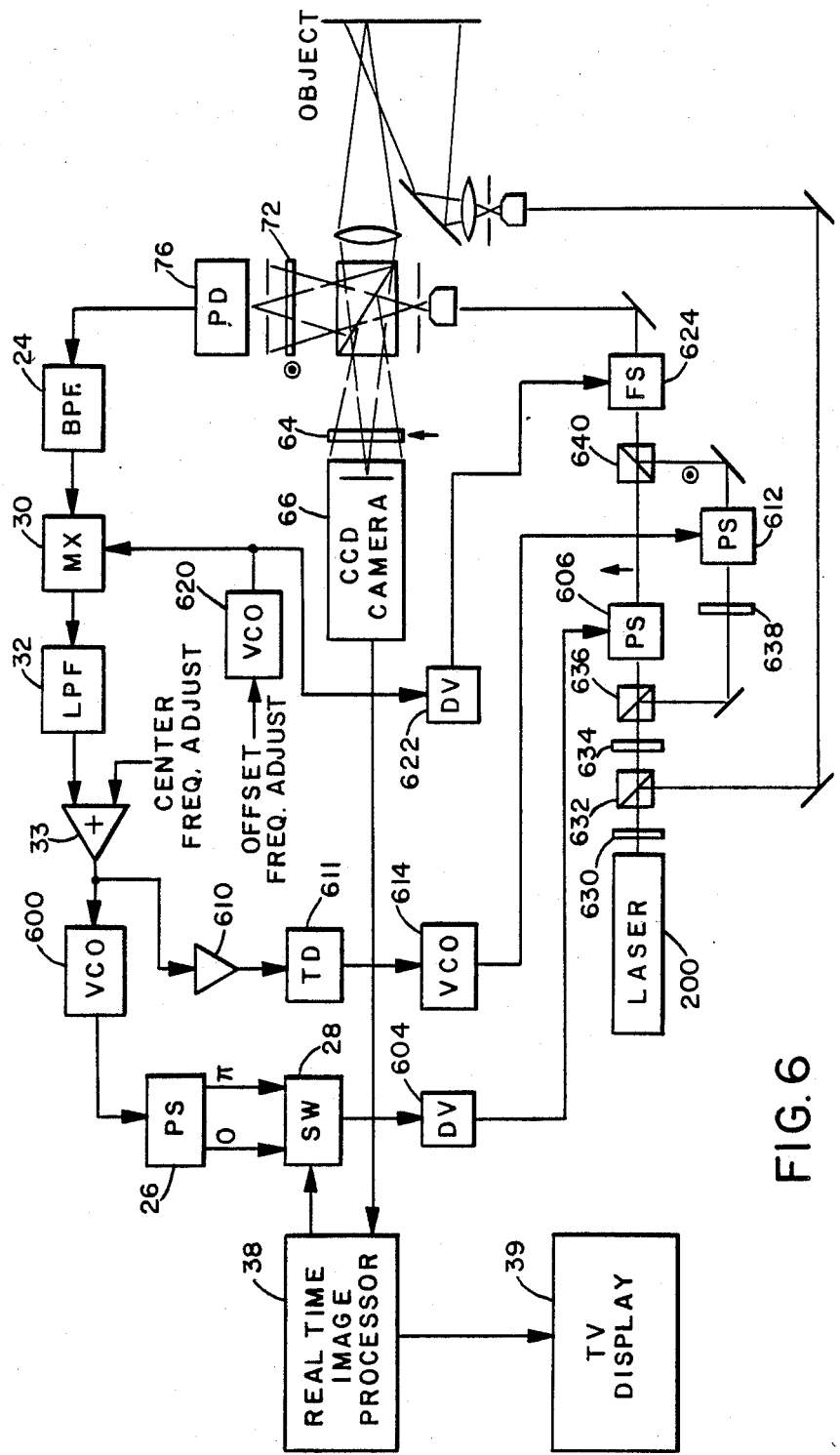
FIG. 6 is a block diagram illustrating a variation of the embodiment of FIG. 3, modified to allow vibration amplitude and phase mapping of the target surface.

In FIG. 6, the provision of first and second, orthogonally distinct local oscillator fields in the second beam, as described above with reference to FIG. 3 is maintained, with the provision of frequency-shifting at an IF frequency provided by the VCO 620, driver 622, and electro-optical frequency shifter 624. In FIG. 6, the first local oscillator field, which is directed to the first image plane by the polarizing element 64, has its phase modulated by a first LO field control loop consisting of a scaling amplitude amplifier 610, a time delay circuit 611, and a voltage controlled oscillator 614, which drives an electro-optical phase shifter 612. The phase modulation of the first local oscillator field is generated by the VCO 614 whose control voltage is the output of the summing amplifier 33 after scaling by the scaling amplifier 610 and delay by the time delay circuit 611. The second local oscillator field, applied to the second image plane at the PDT 76, has its phase modulated as discussed above with reference to FIG. 3 for the first local oscillator field in the FIG. 3 embodiment. In this regard, the CONTROL signal has its phase strobed in synchronism with the phase and frequency of the lock-point Doppler signature and the FORMAT signal by the radio frequency transformer 26 and switch 28. It should be apparent that the frequency of the CONTROL signal applied to the VCO 614 is the same as that applied to the VCO 600, except that its amplitude and phase have been changed. Since the amplitude and phase of the demodulated output of the summing circuit 33 is directly related to the amplitude and phase of the object surface vibration of the lockpoint, by adjusting the scaling amplifier 610 and time delay 611, the CCD camera 66 can be caused to coherently detect regions of the object surface which have the same vibrational frequency as the lock-point speckle, but differ in vibrational amplitude and phase. Using this procedure, coupled with knowledge of the transfer characteristics of the VCO 614, in hertz per volt, and the frequency of the demodulated output provided by the summing amplifier 33, contours of equal amplitude and phase of the surface motion can be generated, and the values of amplitude and phase associated with these contours can be calculated.

Figure 7:
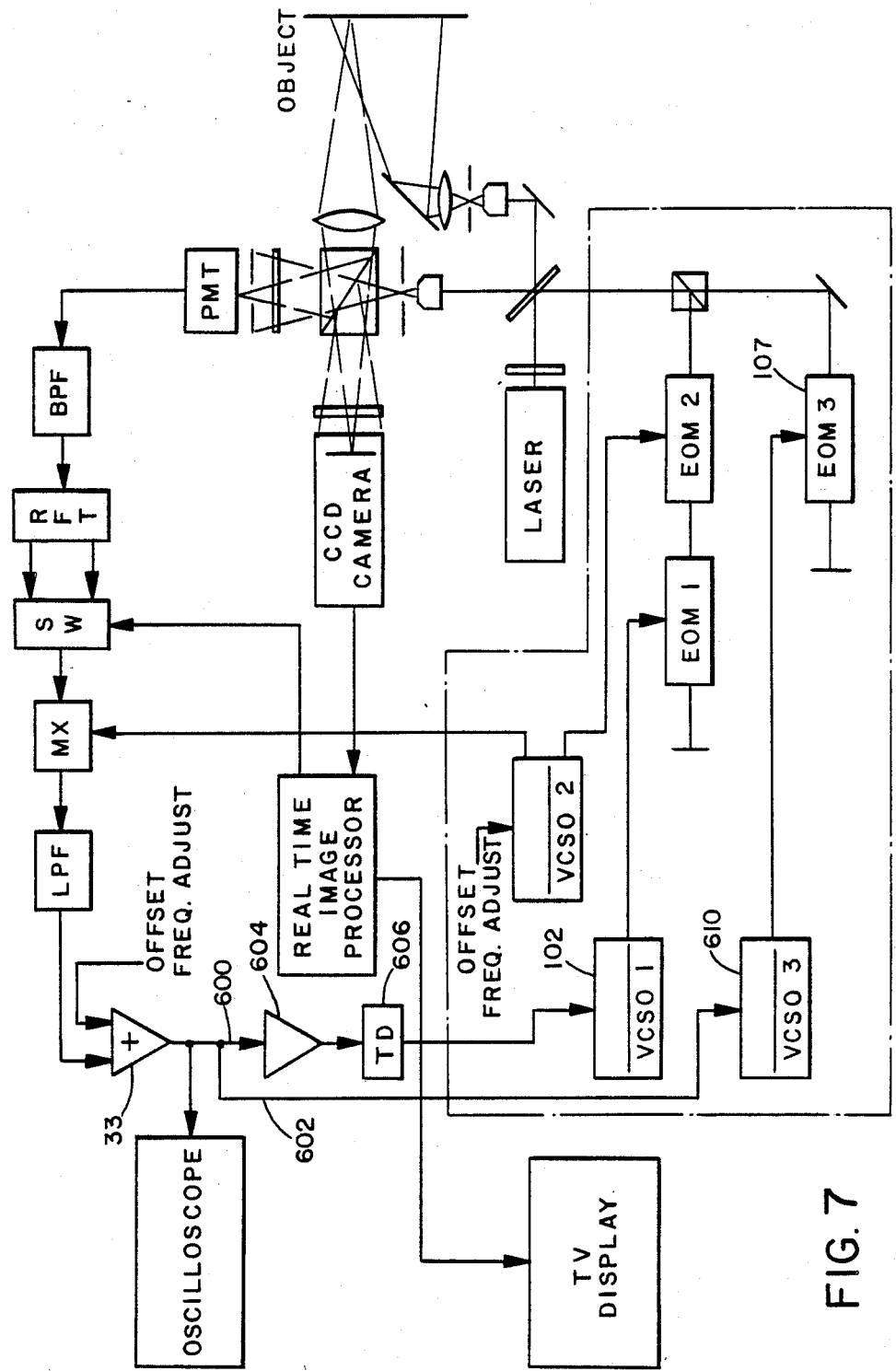
FIG. 7 is a block diagram illustrating a modification of the embodiment of FIG. 2, modified to allow vibration amplitude and phase mapping of the target surface.

FIG. 7 is a block diagram illustrating the embodiment of FIG. 2, modified to allow vibration amplitude and phase mapping of the target surface 10. An additional voltage controlled sawtooth oscillator (VCSO 3) 610 has been added to the system to drive the electro-optical modulator 107. The VCSO 610 is driven by the demodulated output from the summation amplifier 33. Now, addition of a control subloop in the form a scaling amplifier 604 and a time delay 606 is used to adapt the CONTROL signal as described above in reference to FIG. 6 to affect the image produced at the first image plane at the CCD camera 66. The method of generating equal amplitude and phase speckle contours is identical to that described in connection to FIG. 6.

Figure 8:
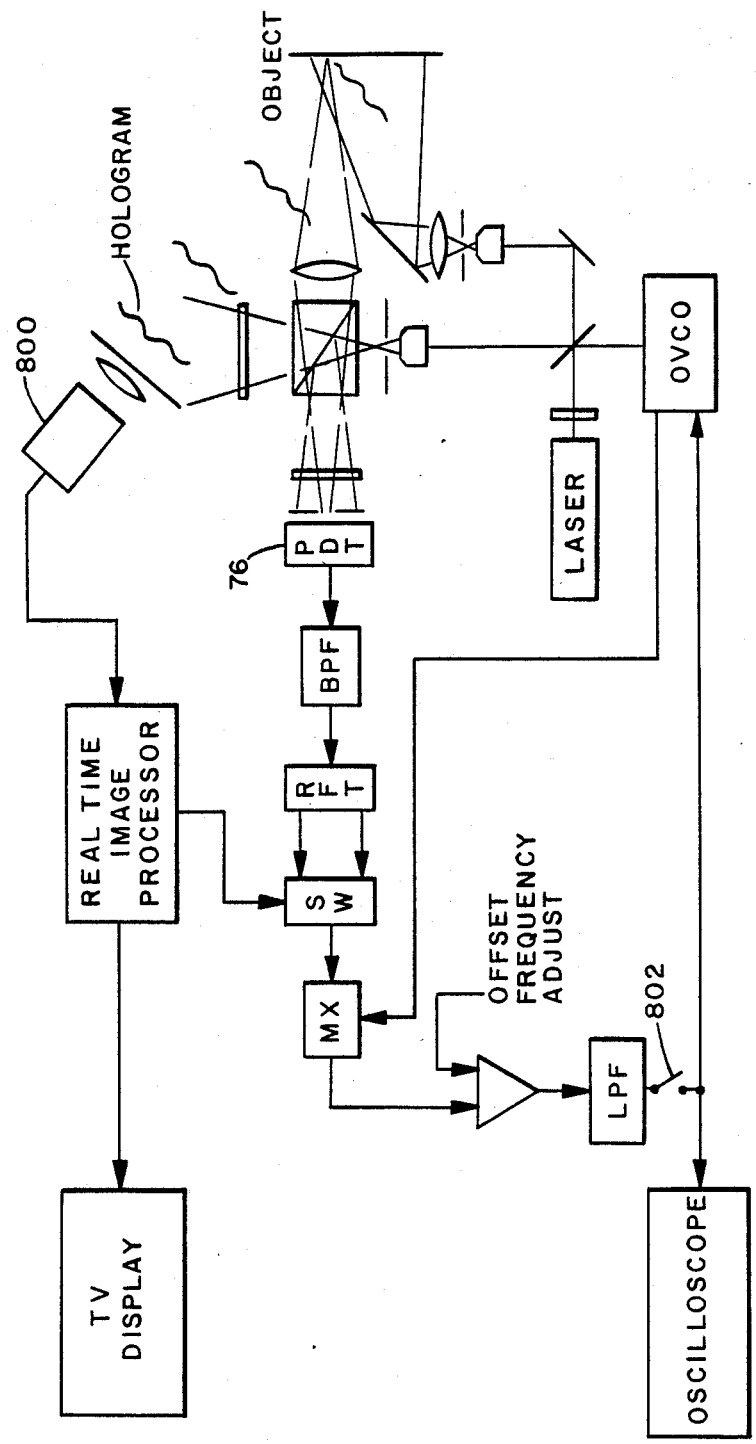
FIG. 8 is a block diagram illustrating an embodiment of the invention in which the image detected by the image is formed by a hologram.

FIG. 8 is a block diagram of the invention in which the first image plane is replaced by a hologram, and the CCD camera 66 by a holographic imager 800. In one application of this variation of the invention, a hologram of the vibrating object is exposed while the system is locked to the particular image speckle sampled by the photodetector 76. The electro-optical feedback loop is then disconnected at the switch 802, the hologram is reconstructed with the unmodulated local oscillator field of the second beam, and the image is viewed with a holographic imager 800. This method generates contours of equal Doppler signatures superimposed on the reconstructed holographic image. Alternatively, a hologram can be recorded of a fixed object while the system is locked to a particular object point. The object is then stressed by a force pattern which is possibly time varying, the hologram is reconstructed with the same phase-locked local oscillator field used during the recording process, and the resultant image is viewed using the imager 800. Superimposed on the reconstructed holographic image of the object will be fringes which contour the surface displacement induced by the forced pattern. These fringe patterns will change in time to correspond to the change in target surface deflection caused by a time-varying load. Each of these implementations are immune to local noise vibrations because of the noise cancellation effects of the optically phase-locked loop. It is also apparent that holographic amplitude and phase mapping can be performed by implementing a configuration which includes the structure of FIG. 7, coupled with a scaling amplifier and time delay circuit.

While the invention has been described in terms of specific embodiments, it will be evident to the skilled artisan that the principles of the invention can be practiced other than as taught herein. For example, much of the optical circuitry employed on the optical circuit 20 to guide or redirect beams can be realized by optical fibers. The OVCO 22 could also be formed using acousto-optical modulators, integrated optical phase modulators, or a separate local oscillator laser. In the event that the object surface 10 is not deformed by a relatively high-frequency disturbance, but rather displaced, stressed, or rotated on axis, the demodulated output of the interferometer representative of such effects would be evident by the time-varying modulation on the CONTROL signal as viewed by, for example, the oscilloscope 80 in FIG. 1. In this case, the optically-phased locked loop portion of the interferometer would lock to "noise" disturbance on the lock-point speckle. Finally, the frames produced by the image processor 38 could be produced at one half the frame rate by, for example, combining sequential pairs of frames without overlapping, for example, by subtracting frame 2 from frame 1 to form a first reference frame, and frame 4 from frame 3 to form a second reference frame, and so on. The image processing could also be conducted on relatively low-frequency variations in target surface reflectivity such as would be caused, for example, by displacement or stressing of the target surface, by considering the first frame to be a reference frame, and then subtracting each frame in the sequence from the reference frame. Last, it should be evident that the invention as described herein with reference to the above embodiment can be practiced in any part of the electro-magnetic spectrum for which the required components are available. A speckle patterns are produced, for example, from sonic imaging. Other adaptations and variations are also possible.

I claim:

1. A method for phase-locked optical interferometric inspection of a surface, comprising the steps of:
producing a first beam of energy by reflection from a target surface;
producing a second beam of energy having signal characteristics, said signal characteristics including frequency and phase;
mixing said first and second beams to produce a first interference pattern at a first image plane and a second interference pattern at a second image plane;

from a portion of said second interference pattern, deriving a control signal with frequency and phase characteristics representing a modulation of said first beam;

in response to said control signal, changing a signal characteristic of said second beam in synchronism with said modulation; and generating successive images from said first interference pattern and combining said successive images to produce a contoured target surface image.

2. The method of claim 1 wherein said energy is light and said modulation is phase modulation of said first beam, and wherein said step of changing a signal characteristic includes modulating the frequency of said second beam substantially in synchronism with said phase modulation.

3. The method of claim 2 wherein said second interference pattern is a pattern of speckles and said step of mixing includes mixing said first and second beams to produce a first interference pattern corresponding to a respective speckle in said second interference pattern.

4. The method of claim 1 wherein said second interference pattern is a pattern of speckles and said step of mixing and producing includes producing a first interference pattern corresponding to a first respective speckle in said second interference pattern.

5. The method of claim 4 further including the step of changing said first interference pattern in response to a second respective speckle in said first interference pattern.

6. The method of claim 1 wherein said energy is light energy, and:

said step of producing said second beam includes producing a first local oscillator field beam and a second local oscillator field beam, said first and second local oscillator field beams including coherent, orthogonally distinct optical fields, and combining said first and second local oscillator field beams to produce said second beam, said second beam including orthogonally distinct first and second local oscillator fields; and said step of mixing includes mixing said first beam with said first local oscillator field to produce said first interference pattern, and mixing said first beam and said second local oscillator field to produce said second interference pattern.

7. The method of claim 6 wherein said step of changing a signal characteristic includes changing the frequencies of said first and second local oscillator field beams.

8. The method of claim 7 wherein said step of changing a signal characteristic includes substantially identically changing the frequencies of said first and second local oscillator field beams within a predetermined range in response to said control signal, and downshifting the frequency of said first local oscillator field beam by a predetermined amount.

9. The method of claim 8 further including applying said control signal to a bandpass filter having a passband substantially equal to said predetermined range.

10. The method of claim 9 further including, after said applying step, the steps of:

generating a mixing signal having a frequency characteristic corresponding to the predetermined amount by which said first local oscillator field beam is downshifted;

mixing said mixing signal with said control signal to produce mixing results in said control signals; and, then, applying said control signal to a low pass filter.

11. The method of claim 1 wherein said energy is light energy and said step of generating includes producing said successive images at a predetermined frame rate and subtracting adjacent images produced at said frame rate to produce said contoured target surface image, said method further including the step of selectively alternating the phase of said control signal between 0° and 180° at said frame rate.

12. The method of claim 1 wherein said energy is light energy, and:

said step of producing said second beam includes producing a second coherent beam of light having first and second, orthogonally distinct, local oscillator fields;

said step of deriving a control signal includes frequency synchronization of said control signal with said modulation and, then, selectively inverting the phase of said control signal;

said step of changing a signal characteristic includes selectively inverting the phase of said first local oscillator field in synchronism with the phase inversion of said control signal; and said step of mixing includes mixing said first local oscillator field with said first coherent light beam to produce said first interference pattern and mixing said second local oscillator field with said first coherent light beam to produce said second interference pattern.

13. The method of claim 12 further including upshifting the frequencies of said first and second local oscillator fields by a predetermined frequency and, prior to said phase synchronization of said control signal, subjecting said control signal further to band-pass filtration in a frequency band including said predetermined frequency.

14. The method of claim 13 wherein said step of generating includes producing said successive frames at a predetermined frame rate and subtracting adjacent images produced at said frame rate, and said step of selectively inverting the phase of said control signal further includes inverting the phase of said control signal at said frame rate.

15. An optical, phase-locked speckle pattern interferometer, comprising:

an image processor with a display, responsive to a succession of interference image signals for generating a sequence of interference images, and for combining successive interference images for production of a contoured target surface image on said display;

an optical circuit for receiving a first beam of light by reflection from a target surface and for generating a second beam of light having signal characteristics of phase and frequency, and for mixing said first and second beams to produce respective first and second interference patterns;

a first imaging apparatus with a first imaging plane for receiving said first interference pattern at said first imaging plane to generate said succession of interference image signals, each of said interference signals corresponding to a speckle pattern image of a target surface;

a second imaging apparatus with a second imaging plane for receiving said second interference pattern at said second imaging plane to generate from said second interference pattern a control signal with frequency and phase characteristics representing speckle modulation of said first beam by said target surface; and an electro-optical locking circuit connected to said optical circuit and to said second imaging apparatus for changing a signal characteristic of said second beam in synchronism with said modulation, said signal characteristic changing being in response to said control signal.

16. The optical, phase-locked speckle pattern interferometer of claim 15 wherein said optical circuit includes:

a source of coherent light for producing said second beam and a source beam of coherent light for projection against a target surface; and an optical mixing apparatus for combining said second beam with a beam of light resulting from the reflection of said source beam by a target surface to produce first and second interference fields.

17. The optical, phase-locked speckle pattern interferometer of claim 15 wherein said second imaging apparatus includes:

photodetection means for selectably detecting Doppler signature modulation of a respective speckle in said speckle pattern and for producing said control signal with frequency characteristics reflecting said Doppler signature modulation.

18. The optical, phase-locked speckle pattern interferometer of claim 17 wherein said second beam includes first and second local oscillator fields and:

said electro-optical locking circuit includes first modulation means responsive to said control signal for modulating the frequency of said first local oscillator field in synchronism with said Doppler signature modulation and for downshifting the frequency of said first local oscillator field by a fixed amount;

said electro-optical locking circuit includes second modulation means responsive to said control signal for modulating the frequency of said second local oscillator field in synchronism with said Doppler signature modulation; and, said optical circuit includes means for mixing said first beam with said first and second local oscillator fields and for directing said first beam, mixed with said first local oscillator field to said first image plane and directing said first beam, mixed with said second local oscillator field to said second image plane.

19. The optical, phase-locked speckle pattern interferometer of claim 18 wherein said first imaging apparatus produces said succession at a predetermined display rate and said electro-optical locking circuit includes means for inverting the phase of said control signal at said display rate.

20. The optical, phase-locked speckle pattern interferometer of claim 19 wherein said image processor combines said successive interference images by subtraction, said subtraction being followed by an absolute value operation.

21. The optical, phase-locked speckle pattern interferometer of claim 19 wherein said electro-optical locking circuit further includes:

a bandpass filter connected to said second imaging apparatus for receiving said control signal from said second image apparatus and subjecting said control signal to band pass filtration;

a circuit for producing a mixing signal with a frequency characteristic reflecting said fixed amount;

a mixer connected to said band pass filter and to said circuit for mixing said control signal with said mixing signal to produce mixing results in said control signal; and a low-pass filter connected to said mixer and to said first and second modulation means for subjecting said control signal mixing results to low-pass filtration, and for providing said control signal with low-pass filtered mixing results to said first and second modulation means.

22. The optical, phase-locked speckle-pattern interferometer of claim 17 wherein said second beam includes first and second local oscillator fields, said first imaging apparatus produces said succession at a predetermined display rate, and:

said electro-optical locking circuit includes:

a phase-locked loop connected to said second imaging apparatus for producing a first modified control signal with a frequency synchronously locked to said Doppler modulation; and phase inversion means responsive to said first modified control signal and to said succession for selectively inverting the phase of said first local oscillator field in synchronism with the phase of said first modified control signal and with said predetermined display rate; and said optical circuit includes means for mixing said first beam with said first and second local oscillator fields and for providing said first beam mixed with said first local oscillator field to said first image plane and providing said first beam mixed with said second local oscillator field to said second image plane.

23. The optical, phase-locked speckle pattern interferometer of claim 22 wherein said phase inversion means includes means for selectively inverting the phase of said first modified control signal to produce a second modified control signal, and said electro-optical modulator includes optical phase modulating means responsive to said second modified control signal for modulating the phase of said first local oscillator field in synchronism with the phase of said second modified control signal.

24. The optical phase-locked speckle pattern interferometer of claim 23 wherein said image processor combines said successive interference images by subtraction.

25. The optical, phase-locked speckle pattern interferometer of claim 17, further including:

field means in said electro-optical locking circuit for generating a local oscillator field in said second beam and for modulating the frequency of said local oscillator field in synchronism with said Doppler signature modulation;

amplitude scaling means connected to said field means for adjustably changing the amplitude of said local oscillator field; and means in said optical circuit for mixing said first beam with said second beam and for directing said first beam, mixed with said local oscillator field, to said first image plane.

26. The optical, phase-locked speckle pattern interferometer of claim 17, further including:

field means in said electro-optical locking circuit for generating a local oscillator field in said second beam and for modulating the frequency of said local oscillator field in synchronism with said Doppler signature modulation;

phase adjustment means connected to said field means for adjustably changing the phase of said local oscillator field; and means in said optical circuit for mixing said first beam with said second beam and for directing said first beam, mixed with said local oscillator field, to said first imaging plane.

27. The optical, phase-locked speckle pattern interferometer of claim 26, further including:

amplitude scaling means connected to said field means for adjustably changing the amplitude of said local oscillator field.

* * * * *